April 20, 1937. E. E. HEWITT 2,077,928
AUTOMATIC TRAIN CONTROL BRAKE
Filed June 25, 1935
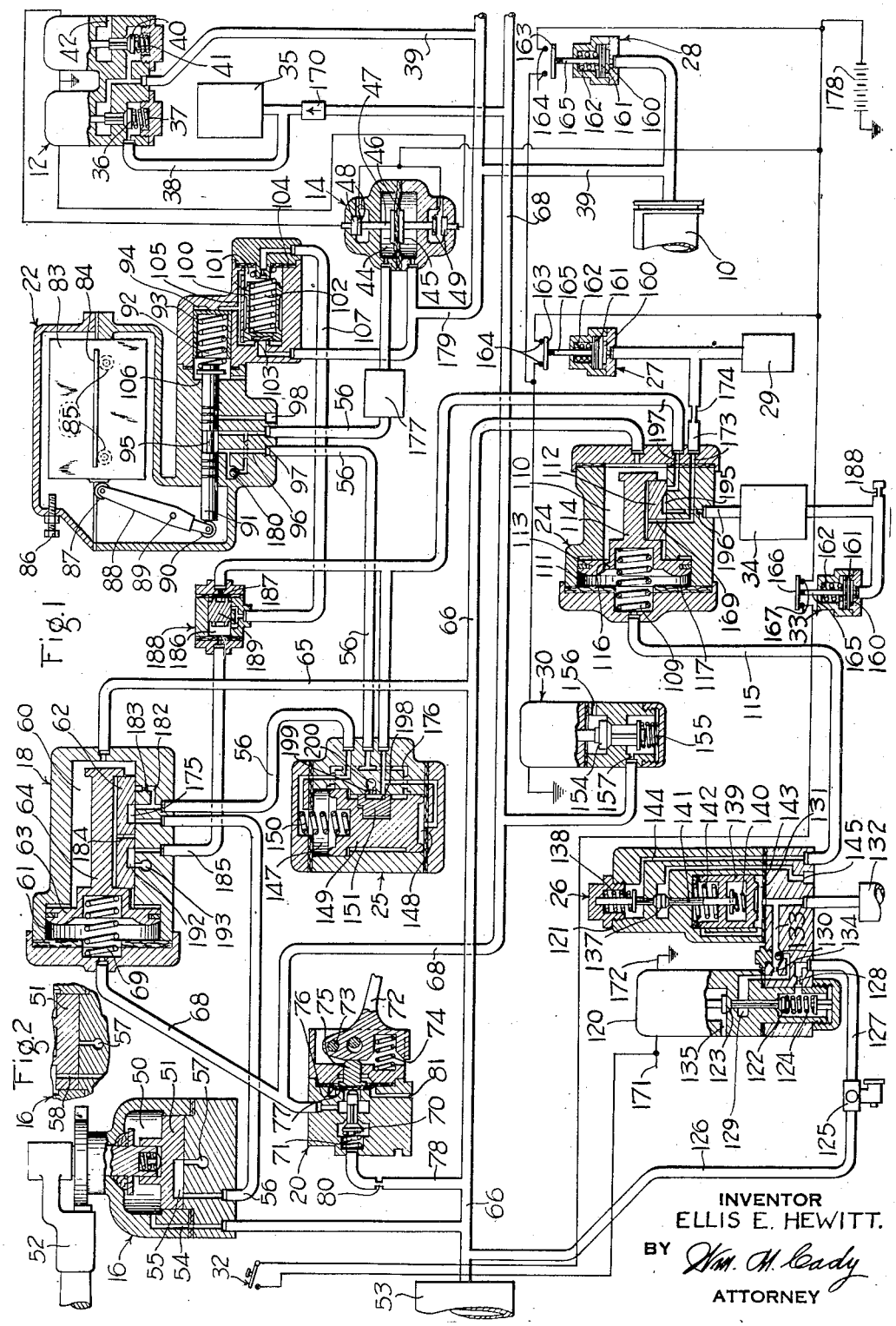
INVENTOR
ELLIS E. HEWITT.
BY Wm. H. Cady
ATTORNEY Patented Apr. 20, 1937

2,077,928

UNITED STATES PATENT OFFICE 2,077,928

AUTOMATIC TRAIN CONTROL BRAKE

Ellis E. Hewitt, Edgewood, Pa., assignor to The Westinghouse Air Brake Company, Wilmerding, Pa., a corporation of Pennsylvania Application June 25, 1935, Serial No. 28,298

27 Claims. (Cl. 303—18)

This invention relates to automatic train control equipment, and more particularly to braking equipments for high speed trains and vehicles controllable by the automatic train control apparatus provided on a railway system.

To insure safe operation of trains on congested railway systems, there is employed what is commonly referred to as "automatic train control". As is well known in the art, the automatic train control apparatus functions to warn the operator of a train of danger of collision with another train or vehicle on the same track, and to effect an application of the train brakes upon too close an approach to the train or vehicle ahead.

With the advent of high speed passenger trains the need for automatic train control becomes increasingly important. It is therefore desirable that the braking equipment provided on such high speed trains be controllable by the automatic train control apparatus. A primary object of the present invention is to provide a braking equipment for high speed trains which is controllable by the automatic train control apparatus.

An example of a braking equipment for high speed trains and vehicles is that described and claimed in my copending application, Serial No. 741,063, filed August 23, 1934. In this type of high speed train braking equipment, an application of the brakes may be effected either by straight air operation or by automatic operation.

A further object of the present invention is to provide a braking equipment of the general type illustrated and described in my aforesaid application which is controllable by automatic train control apparatus to normally effect an application of the brakes by straight air operation, but upon failure of a straight air application to materialize to a predetermined degree in a chosen length of time, to then effect an application by automatic operation.

A still further object of the invention is to provide a braking equipment which is controllable either manually or by automatic train control apparatus, with means under the control of the operator of the train for rendering control by the automatic train control apparatus ineffective when it is desired to control the braking equipment manually.

A still further object of the invention is to provide a novel arrangement and construction of apparatus for generally carrying out the above set forth and other objects as will appear more fully from the following description, which is taken in connection with the attached drawing, wherein Fig. 1 illustrates in schematic and diagrammatic form a simplified embodiment of the invention.

Fig. 2 is a fragmentary sectional view of the brake valve device shown in the upper left of Fig. 1, illustrating the port connections when effecting an application of the brakes through operation of the brake valve device.

Considering briefly at first the elements of the braking equipment illustrated which are normally supplied exclusive of the automatic train control portion, these include a brake cylinder 10, a magnet valve device 12 for controlling the supply of fluid under pressure to and its release from the brake cylinder, and a pneumatic switch device 14 for controlling operation of the magnet valve device 12.

A manually operated brake valve device 16 controls operation of the pneumatic switch device 14 when effecting applications of the brakes by straight air operation, while an emergency valve device 18 and a vent valve device 20 control operation of the pneumatic switch device when effecting applications of the brakes by automatic operation. A retardation controller device 22 is provided to control both straight air and automatic applications of the brakes so as to prevent the rate of retardation produced by application of the brakes from exceeding desired maximum values.

Considering briefly now the automatic train control portion of the embodiment shown, this portion includes an application valve device 24 for controlling operation of the pneumatic switch device 14 during an automatic train control application, and a timing valve device 26 for controlling operation of the application valve device 24.

The application valve device 24 and timing valve device 26 are operable to effect an application of the brakes by straight air operation. For effecting an application of the brakes by automatic operation, upon failure of a straight air application to materialize to a predetermined degree within a chosen length of time, there are provided pneumatic circuit controllers 27 and 28, a timing reservoir 29, and an emergency magnet valve device 30.

In order that the operator may suppress an automatic train control application when desiring to control applications manually, there is provided a suppression switch device 32; but in order that the automatic train control application shall not be suppressed after it has been once initiated, there are provided another pneumatic circuit controller 33 and another timing reservoir 34.

From the above brief description it will be apparent that sufficient apparatus has been shown for the head end car only, but it will be apparent to those skilled in the art that one or more brake cylinders 10, a magnet valve device 12, and a local supply reservoir 35 will be provided on each car or unit in the train.

Considering now more in detail the devices referred to above briefly, the magnet valve device 12 comprises a supply valve 36, which is urged toward a seated position by a spring 37 and toward an unseated position by action of an electromagnet in the upper part of the valve device casing which when energized actuates the valve downwardly. When the valve 36 is unseated, fluid under pressure may flow from the local supply reservoir 35 through pipe 38, past the unseated valve 36, and through a straight air pipe 39 to the brake cylinder 10. When the valve 36 is seated, this flow of fluid is cut-off.

The magnet valve device 12 is also provided with a release valve 40, which is urged toward a seated position by a spring 41 and toward an unseated position by action of another electromagnet in the upper part of the valve device casing which when energized actuates the valve downwardly. When the valve 40 is unseated, a communication is established from the straight air pipe 39, and brake cylinder 10, to the atmosphere, past the unseated valve 40 and through exhaust port 42.

The pneumatic switch device 14 is embodied in a casing provided with an upper chamber 44 and a lower chamber 45 separated by a diaphragm 46 secured in the casing. The diaphragm 46 controls through associated stems 47 a set of release contacts 48 and a set of application contacts 49.

The diaphragm 46 is normally flexed upwardly when there is no pressure, or equal pressures, in chambers 44 and 45, to maintain closed the release contacts 48. When fluid under pressure is supplied to the upper chamber 44, diaphragm 46 is flexed downwardly to open release contacts 48 and to then close application contacts 49. When fluid under pressure is supplied to the lower chamber 45 to a degree slightly below the pressure of fluid in the upper chamber 44, diaphragm 46 moves upwardly to open application contacts 49 and to also maintain open release contacts 48. When the pressure in chamber 45 is substantially equal to or exceeds that in chamber 44, diaphragm 46 moves upwardly to close release contacts 48.

The brake valve device 16 is embodied in a casing provided with a chamber 50 in which is disposed a rotary valve 51 rotatable by a handle 52. The chamber 50 is in communication with a main reservoir 53 by way of pipe and passage 54.

When the handle 52 is in release position the rotary valve 51 is positioned so that a cavity 55 therein connects a control pipe 56 to an exhaust port 57. When the handle 52 is moved to application position, a port 58 in the rotary valve 51 connects the control pipe 56 with the valve chamber 50, as shown in Fig. 2. When the handle 52 is moved to lap position, the rotary valve 51 blanks the connection with the control pipe 56.

The emergency valve device 18 is embodied in a casing provided with a slide valve chamber 60 and a piston chamber 61. Disposed in the slide valve chamber 60 is a slide valve 62 and disposed in the piston chamber 61 is a piston 63 having a stem 64 recessed to receive the slide valve 62 so as to move it coextensively with movement of the piston 63. The slide valve chamber 60 is connected to the main reservoir 53 by way of pipes 65 and 66, while the piston chamber 61 is connected to a brake pipe 68.

The piston 63 is therefore subject on its right hand side to fluid at main reservoir pressure and on its left hand side to the combined pressure of fluid in the brake pipe and that of a biasing spring 69, which acts to urge the piston 63 to the right. When the pressure of fluid in the brake pipe 68, and piston chamber 61, is suddenly reduced, the over-balancing pressure of fluid in slide valve chamber 60 actuates piston 63 to the left to control communications hereinafter more fully described.

The vent valve device 20 is embodied in a casing provided with a valve 70 urged toward a seated position by a spring 71. A manually operated element 72 is provided for effecting unseating of the valve 70. The manually operated element 72 is pivotally mounted at 73 and is normally urged upwardly by spring 74. When the element 72 is actuated downwardly by pressure manually applied by an operator, a plunger 75 is actuated to the left and through a diaphragm 76 engages the stem of the valve 70 to effect unseating thereof. At the same time, the diaphragm 76 engages a seat rib 77.

Unseating of the valve 70 establishes a communication from the main reservoir 53 to the brake pipe 68, by way of pipes 66 and 78, choke 80, and past the unseated valve 70. Seating of the diaphragm 76 on seat rib 77 closes a communication between the brake pipe 68 and the atmosphere, by isolating an exhaust port 81. When the valve 70 is seated, communication between the main reservoir 53 and the brake pipe 68 is cut off, and when the diaphragm 76 disengages from the seat rib 77 the brake pipe is vented to the atmosphere by way of the exhaust port 81.

The retardation controller device 22 is embodied in a casing provided with an inertia operated body 83 having flanges or wings 84 on either side thereof adapted to bear upon frictionless rollers 85 secured to the casing. The retardation controlled device is positioned on the head end car in a manner such that when the train is decelerating the inertia operated body 83 is urged to the left, the limit of its travel being determined by an adjustable screw 86.

When the inertia operated body 83 moves to the left, it engages, through a roller 87, the upper end of a lever 88 to rotate it in a counterclockwise direction about a fulcrum 89. The lower end of the lever 88 then through another roller 90 shifts a slide valve 91 from a biased position to the left to various positions to the right, depending upon the degree of movement of the body 83. Slide valve 91 is normally biased to the left by a spring 92, which reacts between one end of the slide valve 91 and a movable abutment or piston 93 disposed in a chamber 94.

The slide valve 91 is preferably cylindrical in shape and provided with a cavital or reduced portion 95, which is adapted in the biased position of the slide valve to connect passages 96 and 97. The slide valve blanks passage 96 when moved through a first distance to the right, and connects passage 97 with exhaust port 98 when moved through a further distance to the right.

The tension on the spring 92 may be varied by supplying fluid under pressure to the chamber 94, which supply is controlled during straight air applications of the brakes by a valve 100 disposed in a valve chamber 101. A spring 102 normally urges the valve 100 to a left hand position where it seats upon a seat rib 103.

When fluid under pressure is supplied to the space within the seat rib 103, and the value of the pressure rises to some predetermined value, the valve 100 will be actuated to the right until its right hand end seats on gasket 104. Fluid under pressure will then flow past the seat rib 103 and through passage 105 to chamber 94, where the pressure acting on the movable abutment 93 will actuate it to the left until its left hand end engages the wall 106. Spring 92 will thus be compressed a predetermined amount to increase the opposition to movement of slide valve 91.

When the pressure of the fluid thus supplied to chamber 94 diminishes below the aforementioned predetermined value, spring 102 seats the valve 100 on seat rib 103, and fluid under pressure is released to the atmosphere from chamber 94, through passage 105, valve chamber 101, and pipe 107, as will be more fully hereinafter described.

When the chamber 94 is connected to the atmosphere and piston 93 is in its right hand position, spring 92 exerts a minimum opposition to movement of the slide valve 91, and the valve may therefore be moved through a given distance at a relatively low rate of retardation. When, however, the piston or abutment 93 has been actuated to its extreme left hand position, the loading on spring 92 will be such that a higher rate of retardation will be required to move the valve 91 through the same distance as before. Thus it will be apparent that the retardation controller device may be adjusted to limit the rate of retardation produced by an application of the brakes to one of two maximum values.

The application valve device 24 is embodied in a casing having a slide valve chamber 110 and a piston chamber 111. Disposed in the slide valve chamber 110 is a slide valve 112, and disposed in the piston chamber 111 is a piston 113 having a stem 114 recessed to receive the slide valve 112 so as to move it coextensively with movement of the piston 113.

The slide valve chamber 110 is connected to the main reservoir pipe 66, while the piston chamber 111 is connected to a pipe 115 leading to the timing valve device 26. A spring 109 in piston chamber 111 biases the piston 113 to the right. A choked port 116 in piston 113 provides a restricted communication between piston chamber 111 and the slide valve chamber 110. When the pressure of fluid in the piston chamber 111 and pipe 115 is suddenly reduced, piston 113 will move to the left into sealing engagement with gasket 117, in which position slide valve 112 controls communication that will hereinafter be more fully described.

The timing valve device 26 comprises a magnet valve portion 120 and a venting valve portion 121. The magnet valve portion 120 is provided with a supply valve 122 and a release valve 123 which may be integrally secured to a common stem. A spring 124 urges the supply valve 122 toward seated position, and the release valve 123 toward unseated position, while an electromagnet in the upper part of the valve device casing actuates these two valves toward unseated and seated positions, respectively, when energized.

When the supply valve 122 is unseated and release valve 123 is seated, fluid under pressure may flow from a feed valve device 125 (which is connected to the main reservoir 53 by way of pipe 126) through pipe 127, choke 128, past the unseated supply valve 122, through passage 129 where a ball valve 130 is unseated, and passage 133 to piston chamber 131 of the venting valve portion 121, and also to a volume reservoir 132. When the supply valve 122 is seated and release valve 123 is unseated, fluid under pressure is released from both the piston chamber 131 and the volume reservoir 132 to the atmosphere, by way of passage 133, choke 134, passage 129, past the unseated valve 123, and through port 135.

The purpose of the choke 128 is to prevent a too sudden rush of fluid to the piston chamber 131, and volume reservoir 132, so that the movable parts will not be subjected to harsh action or undue noise caused. The purpose of the choke 134 and volume reservoir 132 is to provide a definite time interval for reducing the pressure in piston chamber 131, so as to delay operation of the venting valve portion 121. It will be observed that the fluid released from these two volumes is required to flow through the choke 134, as the ball check valve 130 prevents flow around the choke.

The venting valve portion 121 is provided with a double beat valve 137 which is urged toward a lower seated position by a spring 138 and toward an upper seated position by a piston 139 when fluid under pressure is supplied to the aforementioned piston chamber 131. When the piston 139 moves upwardly due to pressure of fluid therebelow, it acts through a spring 140 to urge the stem 141 of the double beat valve 137 upwardly, so as to actuate the double beat valve to its upper seated position. When fluid under pressure is released from the piston chamber 131, a biasing spring 142 actuates the piston 139 downwardly where it seats on gasket 143.

When the double beat valve 137 is in lower seated position, it establishes communication between pipe 115 (and piston chamber 111 of the application valve device 24) and the atmosphere, by way of passage 144, past the open upper seat of double beat valve 137, and exhaust passage 145. When the double beat valve 137 is in upper seated position this communication is cut off, so that pipe 115 and piston chamber 111 may be charged through the choke 116.

The double check valve device 25 is embodied in a casing provided with a chamber 147 and a chamber 148. Disposed in the casing is a movable abutment 149 subject on one side to the combined pressures of fluid in chamber 147 and a biasing spring 150 and subject on the other side to pressure of fluid in chamber 148. Movable with the movable abutment 149 is a slide valve 151. The purpose of and mode of operation of this double check valve device will be described in the description of operation of this embodiment.

The magnet valve device 30 is embodied in a casing provided with a release valve 154 urged toward an unseated position by a spring 155, and toward a seated position by action of an electromagnet in the upper part of the casing which when energized actuates the valve downwardly. When the valve 154 is unseated, a communication is established between the brake pipe 68 and the atmosphere, by way of the unseated valve 154 and exhaust port 156. When the valve 154 is seated, this communication is cut off. A choke 157 is provided to restrict the rate of release of fluid from the brake pipe.

The pneumatic circuit controllers 27, 28 and 33 are similar in design, each being embodied in a casing having a chamber 160 in which is disposed a piston 161 urged downwardly by a spring 162. In the case of each of the circuit controllers 27 and 28, when piston 160 is urged upwardly a bridging contact 163 bridges stationary contacts 164. The bridging contact 163 is actuated through and insulated from a stem 165.

In the case of the circuit controller 33, when the piston 161 is actuated upwardly a bridging contact 166 is disengaged from stationary contacts 167.

The operation of this embodiment of my invention is as follows:

*Running condition*

When the train is running under power or is coasting, the brake valve handle 52 is maintained in release position. The parts of the braking equipment will be in the positions substantially as shown in the drawing.

The brake pipe 68 will be charged from the main reservoir 53, through the vent valve device 20, as previously described. The local supply reservoir 35 on each unit in the train will be charged from the brake pipe 68, through a check valve device 170, which permits flow of fluid only in the direction indicated by the arrow thereon.

The magnet valve portion 120 of the timing valve device 26 will be maintained energized by the supply of current through a conductor 171 leading from the train control apparatus (not shown) located on the train, the return circuit to the source of supply being by way of ground connection 172. With this magnet valve device energized, fluid under pressure will be supplied from the feed valve device 125 to the piston chamber 131 and volume reservoir 132 to a degree according to the setting of the feed valve device 125. It is to be understood that the feed valve device 125 is preferably one of the conventional types employed, and is set to limit the supply of fluid to the piston chamber 131 and reservoir 132 to a value lower than that existing in the main reservoir 53.

With fluid under pressure supplied to the piston chamber 131, double beat valve 137 will be held in its upper seated position, and piston 113 in the application valve device 24 will be positioned as shown in Fig. 1. Timing reservoir 29 and piston chamber 160 of circuit controller 27 will have fluid under pressure supplied thereto from the main reservoir pipe 66, through slide valve chamber 110, slide valve port 169, pipe and passage 173, and choke 174. Above a predetermined pressure circuit controller 27 will maintain its contacts 164 bridged by contact 163, so that with main reservoir pressure in piston chamber 160 the circuit controller parts will be in the position shown in the drawing.

*Service or straight air application*

When it is desired to effect a service or straight air application of the brakes from the brake valve device 16, the handle 52 is turned to application position, where port 58 in the rotary valve 51 registers with the passage connecting with control pipe 56. Fluid under pressure then flows from the main reservoir 53, through pipe and passage 54, the rotary valve chamber 50, port 58, a first portion of control pipe 56, cavity 175 in emergency slide valve 62, a second portion of control pipe 56, double check valve chamber 147, passage 176, a third portion of control pipe 56, passages 96 and 97 and cavity 95 in the retardation controller device 22, and through a fourth portion of the control pipe 56 to a control reservoir 177 and the upper chamber 44 in the pneumatic switch device 14.

Fluid supplied to the upper chamber 44 actuates diaphragm 46 downwardly to first open release contacts 48. Opening of release contacts 48 deenergizes the release electromagnet in each magnet valve device 12 throughout the train, by interrupting the circuit shown leading from a battery 178 on the head end car. Release valve 40 will then be seated by the spring 41 to close the communication between each brake cylinder 10 and the atmosphere.

As diaphragm 46 moves further downwardly application contacts 49 will be closed, to energize each application electromagnet in each magnet valve device 12, to effect unseating of the supply valve 36. Fluid under pressure will then flow from each local or supply reservoir 35 through pipe 38, past the unseated valve 36, and through straight air pipe 39 to each brake cylinder 10.

Fluid flowing to the brake cylinder 10 on the head end car also flows through pipe 179 to the lower chamber 45 in the switch device 14, and to the space within the seat rib 103 in the retardation control device 22.

Assuming now that the brake valve handle 52 has been permitted to remain in application position, fluid under pressure will be supplied to the upper chamber 44 to a maximum degree. Therefore, when the pressure of fluid supplied to the brake cylinder 10 and the lower chamber 45 has reached a value slightly below the pressure of fluid in the upper chamber 44, diaphragm 46 will move upwardly to open application contacts 49 and to maintain open release contacts 48. The supply valve 36 in each magnet valve device 12 will then be seated, and the supply of fluid under pressure to the brake cylinders 10 throughout the train will be lapped.

The pressure which actuates the valve 100 in the retardation controller device to its right hand position is preferably considerably below the maximum which is supplied to the brake cylinder 10, so that in the case assumed the valve 100 will be actuated to its right hand position before the supply to the brake cylinder is lapped. Fluid will then flow past seat rib 103 and through passage 105 to the chamber 94, where spring 92 will be compressed to set the retardation controller device to limit the rate of retardation to a chosen maximum value.

If the brakes are applied while the train is traveling at a relatively high rate of speed, the rate of retardation initially produced may not be at or near the maximum provided for by the retardation controller device, due to the coefficient of friction between the rubbing parts of the brakes being lower at high speeds than at low speeds. However, as the speed of the vehicle diminishes, the coefficient of friction between the rubbing parts of the brakes will increase so that the rate of retardation will increase.

The inertia operated body 83 in the retardation controller device will then be actuated to the left. As the maximum desired rate of retardation is approached, the body 83 shifts slide valve 91 to a first position where passage 96 is blanked, so that the brake valve 16 is isolated from connection with the control reservoir 177 and pneumatic switch device 14.

When the maximum value is exceeded the slide valve 91 is shifted still further to the right, where cavity 95 connects passage 97 to exhaust port 98, to release fluid under pressure from the control reservoir 177 and the upper switch chamber 44. The purpose of providing the control reservoir 177 is to add additional volume to the system, so that the release of fluid under pressure will be gradual enough to maintain the desired maximum rate of retardation within chosen limits.

As fluid under pressure is released from the switch chamber 44 diaphragm 46 moves upwardly to close release contacts 48, to thereby cause unseating of each release valve 40 throughout the train, whereupon fluid under pressure will be released from each brake cylinder 10. As the pressure in each brake cylinder is thus diminished, the rate of retardation will also diminish, and will continue to diminish until the body 83 moves toward the right far enough for slide valve 91 to be shifted by the spring 92 to the position where the exhaust passage 98 is blanked.

A little thought will show that as the speed of the train diminishes the body 83 will move back and forth to intermittently effect a release of fluid under pressure from the brake cylinders 10 throughout the train, so as to prevent the rate of retardation from exceeding a desired maximum value.

As the brake cylinder pressure diminishes, a value will be reached where the brake cylinder pressure will be insufficient to maintain the valve 100 in its right hand position. Spring 102 will then actuate valve 100 to its left hand seated position, whereupon fluid under pressure will be released from the chamber 94 to the atmosphere, through passage 105, chamber 101, pipe 107, chamber 186 of double check valve device 188, pipe 185, cavity 192, and exhaust port 193.

The initial tension placed on spring 92 will thus be released, and the retardation controller device will be set for a lower maximum rate of retardation. The brake cylinder pressure at which the valve 100 is actuated to its left hand seated position is preferably chosen such that this change in the retardation controller setting will take place near the end of the deceleration period, so that the train will be brought to a smooth stop.

When it is desired to effect a release of the brakes, the brake valve handle 52 is moved to release position, where cavity 55 connects the control pipe 56 to exhaust port 57. Fluid under pressure will then be released from the upper switch chamber 44 to the atmosphere through the same communication through which it was supplied. If, however, passage 96 of the retardation control device is at this time blanked by the slide valve 91, a check valve 180 will unseat to establish a by-pass communication between the two connected portions of the control pipe 56, so that the release may be effected.

*Emergency or automatic application*

If for any reason the straight air portion of the braking equipment is rendered inoperative, an emergency or automatic application may be effected by releasing pressure manually applied to the element 72 of the vent valve device 20.

When pressure is released on the element 72, valve 70 is seated by its spring 71 to cut off communication between the brake pipe 68 and the main reservoir 53, while diaphragm 76 moves away from its seat rib 77 to vent the brake pipe 68 to the atmosphere through port 81. As a consequence of this venting the pressure is reduced in both the brake pipe and the piston chamber 61 of the emergency valve 18, whereupon the overbalancing pressure in the slide valve chamber 60 actuates the piston 63 to the extreme left hand position.

The slide valve 62 is thus shifted to application position, where it blanks the forward or first portion of the control pipe 56, and where it uncovers a passage 182, having a choke 183, connecting with the second portion of the control pipe 56. At the same time, a port 184 in the slide valve registers with a passage connecting with pipe 185. Fluid under pressure then flows from the main reservoir 53, through pipes 65 and 66, slide valve chamber 60, choke 183, and passage 182 to the second portion of the control pipe 56, from whence it flows to the upper switch chamber 44 through the communication described for a service or straight air application.

At the same time, fluid also flows through slide valve port 184, and pipe 185, to chamber 186 in double check valve device 188, where the pressure of the fluid actuates a slide valve 189 to the right to open communication to a pipe 107 leading to chamber 101 of the adjusting mechanism of the retardation controller device 22. From chamber 101 fluid flows through passage 105 to chamber 94, where spring 92 is compressed to set the retardation controller device for its maximum setting.

As will be obvious, the pressure of fluid supplied to the switch chamber 44 will reach a maximum in a short time, and the switch device 14 will thus control the magnet valve devices 12 throughout the train to effect a supply of fluid under pressure to the brake cylinders 10 to a maximum degree.

Fluid flowing to the brake cylinders 10 on the head end car also flows to the space at the left end of the valve 100 of the retardation control device, but the overbalancing pressure acting on the right side of the piston, due to the combined pressure of fluid in chamber 101 and that of spring 102, maintains the valve in its left hand position.

With the brakes thus applied to a maximum degree, the retardation controller device will shortly assume control and permit the train to be decelerated to a stop at its maximum rate of retardation. That is, since fluid at main reservoir pressure, instead of at brake cylinder pressure, was supplied to the chamber 94 of the retardation control device, spring 92 will be compressed to maintain the maximum setting throughout the entire deceleration period.

The functioning of the retardation controller device therefore is substantially the same as during a service or straight air application of the brakes, except for maintaining the higher maximum rate of retardation throughout the entire deceleration period, instead of diminishing the rate near the end of the stop.

To effect a release of the brakes following an emergency or automatic application, pressure is again manually applied to the element 72 of the vent valve device 20, whereupon the brake pipe 68 will be recharged from the main reservoir 53. Piston 63 in the emergency valve device 18 will then be actuated to the right to cut off further supply of fluid under pressure to the control pipe 56, and to connect the control pipe to the atmosphere through the exhaust port 57 in the brake valve device 16.

At the same time, pipe 185 is connected by cavity 192 to exhaust port 193, so that fluid under pressure is released from the chamber 94 of the retardation control device to the atmosphere through this exhaust port.

*Automatic train control application*

As before stated, the electromagnet in the magnet valve portion 120 of the timing valve device 26 is maintained energized at all times while the train is running under normal conditions.

If now the train approaches a danger zone, the automatic train control apparatus will function to cut off the supply of current through the conductor 171 and thereby deenergize the electromagnet in the magnet valve portion 120. Spring 124 will therefore seat the supply valve 122 and unseat the release valve 123. Fluid under pressure will then be released from both the piston chamber 131 and the volume reservoir 132 to the atmosphere through the communication heretofore described. Since choke 134 is in this communication, a predetermined interval of time will elapse before the pressure of fluid in the piston chamber 131, and volume reservoir 132, will have diminished to the point where spring 142 actuates piston 139 downwardly into engagement with gasket 143.

When, however, piston 139 has thus moved downwardly, double beat valve 137 will be actuated to its lower seated position, and fluid under pressure will be released from the application valve piston chamber 111 to the atmosphere, through the communication heretofore described, and piston 113 will move to its left hand position. This movement of piston 113 will shift slide valve 112 to the position where a passage 197 is uncovered and where timing reservoir 29 and piston chamber 160 of the circuit controller 27 will be connected to timing reservoir 34 and piston chamber 160 of the circuit controller 33.

Fluid under pressure will then flow through choke 174, pipe and passage 173, cavity 195, and pipe and passage 196, to the timing reservoir 34 and circuit controller 33. The choke 174 is provided to limit the rate of flow and thus provide an interval of time before the pressure in piston chamber 160 of the circuit controller 27 will have been reduced sufficiently for contacts 164 to be disengaged by contact 163.

During this interval of time fluid under pressure will be supplied from the main reservoir pipe 66, through slide valve chamber 110, and pipe and passage 197, to double check valve chamber 148 of double check valve device 25, and to double check valve chamber 187 of double check valve device 188. Fluid flowing to the double check valve device 25 also flows through cavity 198 and choke 199 to an exhaust port 200, but the size of choke 199 is such that before sufficient fluid flows to the atmosphere the pressure in chamber 148 will rise to a value such that the abutment 149 will be actuated to its extreme upper position, where slide valve 151 blanks exhaust port 200.

Fluid may then flow from chamber 148 through passage 176 to the third portion of control pipe 56, and from thence through the retardation controller device to the control reservoir 177 and upper switch chamber 44, to effect an application of the brakes as heretofore described for service and emergency applications.

Fluid flowing to the double check valve chamber 187 in the double check valve device 188, actuates the slide valve 189 to the left and flows through pipe 107 to the retardation controller chamber 94, to compress spring 92 as before described. The retardation controller device is therefore set to limit the rate of retardation to the higher maximum value throughout the entire stop, since fluid has been supplied direct from the main reservoir 53.

The time interval provided by the choke 174 is of sufficient duration so that if the automatic train control application effected in the manner just described fully materializes, sufficient brake cylinder pressure will be established to cause circuit control device 28 to close its contacts 164 before the circuit control device 27 opens its contacts 164. Therefore, magnet valve device 30 will be maintained energized from the battery 178 to prevent venting of the brake pipe 68 so long as the straight air portion of the brake equipment is operative.

If, however, the straight air portion is inoperative, such that circuit controller device 28 does not close its contacts 164 before circuit controller device 27 opens its contacts 164, then the magnet valve device 30 will be deenergized to vent the brake pipe 68. Venting of the brake pipe through this magnet valve device will effect an automatic application of the brakes in the same manner as heretofore described for an emergency or automatic application.

If the train operator has received a signal that he is approaching a danger zone, and desires to prevent an automatic train control application of the brakes, he may do so by closing the contacts of the suppression switch device 32. Closing of these contacts will maintain energized the electromagnet in the magnet valve portion 120, from the battery 178, so that cutting off the supply of current to the conductor 171 will not result in an automatic train control application.

If, however, an automatic train control application has been once initiated, and application valve device 24 has been operated to connect the two timing reservoirs 29 and 34, then the pressure of fluid supplied to the timing reservoir 34 will at a very low value actuate the contact 166, of the circuit controller device 33, out of engagement with the stationary contacts 167, so that closing of switch 32 will not maintain the magnet valve portion 120 energized. Therefore, once an automatic train control application has been initiated by the automatic train control apparatus, the operator is unable to suppress the application by closing of the switch device 32.

Fluid flowing to timing reservoir 34 and circuit controller 33 will in time leak away to the atmosphere through choke 188, but not at a rate fast enough to cause opening of contacts 167 before the train is stopped.

To effect a release of the brakes following an automatic train control application, the magnet valve portion 120 must first be re-energized to effect seating of release valve 123 and unseating of supply valve 122. Fluid under pressure will then be supplied from the feed valve device 125 to both the piston chamber 131 and volume reservoir 132. The double beat valve 137 will be thus actuated to upper seated position, to permit pipe 115 and piston chamber 111 to be recharged through choke 116. Piston 113 and slide valve 112 will thereafter move to release position when the pressures on either side of piston 113 becomes substantially equal.

The brake valve handle 52 is next turned to application position to supply fluid under pressure to chamber 147 of double check valve device 25 to a degree sufficient to actuate the movable abutment 149 to its lowermost position, where fluid in pipe 197 and chamber 148 will be vented to the atmosphere through cavity 198 in slide valve 151, and exhaust port 200. The brake valve handle 52 is then turned back to release position to release fluid under pressure from switch device chamber 44 in the manner before described.

It will be seen that upon deenergizing the magnet valve portion 120, the timing valve device 26 effects operation on the application valve 24 to effect an application of the brakes by straight air application. Should, however, a predetermined brake cylinder pressure fail to materialize within a predetermined length of time, the emergency magnet valve device 30 will be deenergized to effect an application of the brakes by automatic operation. The braking apparatus embodying the invention thus provides for a high degree of reliability, which increases the degree of safety in operation.

While I have described my invention with particular reference to one embodiment thereof, it is to be understood that I do not intend to be limited to the specific details of this embodiment, not otherwise than by the spirit and scope of the appended claims.

Having now described my invention, what I claim as new and desire to secure by Letters Patent, is:

1. In a train brake system, in combination, means for manually effecting an application of the train brakes either by straight air operation or by automatic operation, means controlled by the automatic train control apparatus of the railway system for effecting an application of the train brakes by straight air operation, and means operable upon failure of the application by straight air operation to materialize effectively for effecting the application by automatic operation.

2. In a brake system for a train operable on a railway system having automatic train control, in combination, brake means for the train, means under control of the train operator for manually effecting applications of said brake means either by straight air operation or by automatic operation, and electroresponsive means controlled by said automatic train control for effecting applications of said brake means by straight air operation, and operable upon failure of the straight air application to materialize to a chosen degree in a given time to effect the application by automatic operation.

3. In a brake system for a train operable upon a railway system having automatic train control, in combination, brake means for the train, means under the control of the train operator for manually effecting an application of said brake means, electroresponsive means controlled by said automatic train control for also effecting an application of said brake means, and means governed by the rate of retardation of the train for limiting the degree of application of said brake means regardless of whether effected by said manually controlled means or by said electroresponsive means.

4. In a train brake system, in combination, fluid pressure brake means, means providing a communication through which fluid under pressure is supplied to effect an application of said brake means, manually controlled means for effecting a supply of fluid under pressure through said communication, electroresponsive means operable by automatic train control apparatus of the railway system to also effect a supply of fluid under pressure through said communication, and means governed by the rate of retardation of the train for controlling the flow of fluid through said communication.

5. In a train brake system, in combination, brake means for braking the train, manually controlled means for effecting an application of said brake means by the train operator, remotely controlled means for effecting an application of said brake means in response to a predetermined operation of automatic train control apparatus of the railway system, and selective means for selecting between said two control means when operated simultaneously, according to which is operable to effect an application of said brake means to the greater degree.

6. In a train brake system, in combination, brake means for braking the train, electroresponsive valve means for controlling said brake means, fluid pressure operated switch means for controlling said electroresponsive valve means, means for manually effecting and controlling a supply of fluid under pressure to operate said switch means, and means controlled by the automatic train control apparatus of the railway system for also effecting and controlling a supply of fluid under pressure to operate said switch means.

7. In a train brake system, in combination, brake means for each unit in the train, electroresponsive valve means for each unit in the train for controlling said brake means, a fluid pressure operated switch device for the head end train unit for controlling the electroresponsive valve means on each unit in the train, manually controlled means for controlling operation of said switch means, remotely controlled means for also controlling operation of said switch means, and selective means for selecting between said two control means when operated simultaneously.

8. In a train brake system, in combination, brake means for braking the train, means controlled by the automatic train control apparatus of the railway system for effecting an application of said brake means by straight air operation, and means operable after a chosen length of time upon failure of said straight air means to effect an application of said brake means to a chosen degree for effecting an application by automatic operation.

9. In a train brake system, in combination, brake means for braking the train, means controlled by the automatic train control apparatus of the railway system for effecting an application of said brake means by straight air operation, and means operable after a predetermined interval of time for effecting an application of said brake means by automatic operation, and means controlled by said brake means for preventing said application by said automatic means.

10. In a vehicle brake system, in combination, a brake cylinder, remotely controlled electroresponsive valve means, means responsive to operation of said electroresponsive valve means for effecting a supply of fluid under pressure to said brake cylinder by straight air operation, means also responsive to the same operation of said electroresponsive valve means for effecting after a predetermined interval of time a supply of fluid under pressure to said brake cylinder by automatic operation, and means controlled by brake cylinder pressure for controlling said last mentioned means.

11. In a vehicle brake system, in combination, a brake cylinder, electroresponsive valve means, controlled by said electroresponsive valve means for effecting a supply of fluid under pressure to said brake cylinder, a brake pipe, means operated upon a reduction in brake pipe pressure for also effecting a supply of fluid under pressure to said brake cylinder, means also responsive to operation of said electroresponsive valve means for effecting after a predetermined interval of time a reduction in brake pipe pressure, and means operable at a predetermined brake cylinder pressure for preventing operation of said last means to effect a reduction in brake pipe pressure.

12. In a vehicle brake system, in combination, a brake cylinder, an application valve device operable upon a variation of fluid pressure to effect a supply of fluid under pressure to said brake cylinder, a brake pipe, means operable upon a reduction in brake pipe pressure for also effecting a supply of fluid under pressure to said brake cylinder, means operable when and after said application valve device is operated to effect after a chosen interval of time a reduction in brake pipe pressure, and means operated at a predetermined pressure of fluid supplied to said brake cylinder by operation of said application valve device for preventing said reduction in brake pipe pressure.

13. In a vehicle brake system, in combination, a brake cylinder, an application valve device operable to an application position to effect a supply of fluid under pressure to said brake cylinder, a brake pipe, means operated upon a reduction in brake pipe pressure for also effecting a supply of fluid under pressure to said brake cylinder, a normally energized magnet valve device operable when deenergized to effect a reduction in brake pipe pressure, a first normally closed switch device operable when opened to deenergize said magnet valve device, means operated when said application valve device is in application position to effect opening of said first switch device after a predetermined interval of time, and means operated at a predetermined pressure of fluid supplied to said brake cylinder by said application valve device for preventing said switch device from deenergizing said magnet valve device.

14. In a vehicle brake system, in combination, a brake cylinder, an application valve device operable when in application position to effect a supply of fluid under pressure to said brake cylinder, a brake pipe, means operated upon a reduction in brake pipe pressure for also effecting a supply of fluid under pressure to said brake cylinder, a normally closed circuit, means operated upon opening of said normally closed circuit for effecting a reduction in brake pipe pressure, a first switch device having a chamber normally charged with fluid under pressure and operated upon a decrease in pressure in said chamber to open said normally closed circuit, means operable when said application valve device is in application position to effect a reduction of pressure in said chamber, and a second switch device operated at a predetermined brake cylinder pressure for maintaining said circuit closed to prevent a reduction in brake pipe pressure.

15. In a train brake system, in combination, a brake cylinder, electroresponsive valve means controllable by the automatic train control apparatus of the railway system, an application valve device operated in response to operation of said electroresponsive valve means for effecting a supply of fluid under pressure to said brake cylinder, a retardation controller device for controlling the supply of fluid under pressure to said brake cylinder and having a chamber to which fluid under pressure is supplied to vary the setting of said retardation controller device, and means operable when said application valve device is in application position for effecting a supply of fluid under pressure to said chamber.

16. In a train brake system, in combination, brake means, manually controlled means for effecting an application of said brake means, remotely controlled means for also effecting an application of said brake means, a retardation controller device for controlling either application of said brake means and having an adjusting mechanism for adjusting the setting of said retardation controller device, means for operating said adjusting mechanism in response only to a predetermined degree of a manually effected application of said brake means, and means operable in response to operation of said remotely controlled means for effecting operation of said adjusting means.

17. In a vehicle brake system, in combination, a brake cylinder, an application valve device operable to an application position to effect a supply of fluid under pressure to said brake cylinder, an adjustable type retardation controller device for controlling the supply of fluid under pressure to said brake cylinder, means operable when said application valve device is in said application position to adjust said retardation controller device for a maximum setting, and electroresponsive means for controlling operation of said application valve device.

18. In a brake system for a train operable upon a railway system having automatic train control, in combination, fluid pressure brake means for the train, means under the control of the train operator for manually effecting a supply of fluid under pressure by either straight air or automatic operation to effect an application of said brake means, electroresponsive means controlled by said automatic train control and operable independently of said last mentioned means for also effecting supply of fluid under pressure to effect an application of said brake means, and means controlled by the rate of retardation of the train for controlling either of said supplies regardless of whether effected by said manually controlled means or by said electroresponsive means.

19. In a train brake system for a train operable upon a railway system having automatic train control, in combination, brake means for the train, a control pipe, means under the control of the train operator for manually effecting a supply of fluid under pressure to said pipe, electroresponsive means controlled by said automatic train control for also effecting a supply of fluid under pressure to said pipe, means for effecting an application of said brake means according to the degree of pressure of fluid supplied to said pipe, and means governed by the rate of retardation of the train for controlling the degree of pressure of fluid supplied to said pipe regardless of whether effected by said manually controlled means or by said electroresponsive means.

20. In a train brake system, in combination, fluid pressure brake means for braking the train, manually controlled means operable by the train operator for effecting a supply of fluid under pressure to effect an application of said brake means, remotely controlled means for effecting a supply of fluid under pressure to effect an application of said brake means in response to a predetermined operation of automatic train control apparatus of the railway system, and selective means for selecting between said supplies when said two control means are operated simultaneously, according to which supply is operable to effect an application of said brake means to the greater degree.

21. In a train brake system, in combination, brake means for braking the train, electroresponsive valve means for controlling said brake means, fluid pressure operated switch means for controlling said electroresponsive valve means, means for manually effecting and controlling a supply of fluid under pressure to operate said switch means, means controlled by the automatic train control apparatus of the railway system for also effecting and controlling a supply of fluid under pressure to operate said switch means, and a double check valve device for selecting between said two supplies when said two last means are operated simultaneously.

22. In a train brake system, in combination, brake means for each unit in the train, electroresponsive valve means for each unit in the train for controlling said brake means, a fluid pressure operated switch device for the head end train unit for controlling the electroresponsive valve means on each unit in the train, manually controlled means for controlling operation of said switch device, remotely controlled means for also controlling operation of said switch device, and a double check valve device for selecting between said two control means.

23. In a vehicle brake system, in combination, brake means, a normally energized magnet valve device, means responsive to deenergization of said magnet valve device for effecting an application of said brake means, a first circuit for normally maintaining said magnet valve device energized, said first circuit being adapted to be interrupted upon operation of automatic train control apparatus, a by-pass circuit for maintaining said magnet valve device energized upon interruption of said first circuit, a manually operated switch disposed in said by-pass circuit, and a pneumatic switch also disposed in said by-pass circuit, said pneumatic switch being adapted to render said manually controlled switch ineffective to effect closing of said by-pass circuit.

24. In a vehicle brake system, in combination, brake means, a normally energized magnet valve device, means responsive to deenergization of said magnet valve device for effecting an application of said brake means, a circuit leading directly to said magnet valve device and adapted when closed to maintain said magnet valve device energized, a normally open manually operated switch disposed in said circuit, and a normally closed pneumatically operated switch also disposed in said circuit, said two switches being adapted to control opening and closing of said circuit.

25. In a vehicle brake system, in combination, a brake cylinder, an application valve device operable to an application position to effect a supply of fluid under pressure to said brake cylinder, a normally energized magnet valve device operable when deenergized to effect operation of said application valve device to application position, a first circuit for normally maintaining said magnet valve device energized, a second circuit adapted to be closed to maintain said magnet valve device energized when said first circuit is opened, a manually operated switch adapted when operated to close said second circuit, a pneumatic switch having normally closed contacts in said second circuit and being adapted to open said contacts when fluid under pressure is supplied thereto, and means for supplying fluid under pressure to said pneumatic switch when said application valve device is in application position.

26. In a vehicle brake system, in combination, a brake cylinder, an application valve device operable to an application position to effect a supply of fluid under pressure to said brake cylinder, a normally energized magnet valve device operable when deenergized to effect operation of said application valve device to application position, a first circuit for normally maintaining said magnet valve device energized, a second circuit adapted to be closed to maintain said magnet valve device energized when said first circuit is opened, a manually operated switch device adapted to close said second circuit, a pneumatic switch device having normally closed contacts in said second circuit and being adapted to open said contacts when fluid under pressure is supplied thereto, means for supplying fluid under pressure to said pneumatic switch device when said application valve device is in application position, and timing means for controlling the supply to said pneumatic switch device.

27. In a vehicle brake system, in combination, brake means, a normally energized magnet valve device, means operable upon deenergization of said magnet valve device for effecting an application of said brake means, a circuit for energizing said magnet valve device, manually operated switch means for closing said circuit, fluid pressure operated switch means having normally closed contacts in said circuit and adapted upon supply of fluid under pressure thereto to open said contacts, means for establishing a communication through which fluid under pressure is supplied to said fluid pressure operated switch means when an application of said brakes is effected, and means providing a restricted passage between said communication and the atmosphere, whereby the pressure of fluid supplied to operate said switch means is subsequently diminished due to loss of pressure through said passage.

ELLIS E. HEWITT.